June 5, 1928.

H. D. GEYER

AUTOMOBILE CURTAIN WINDOW

Filed Feb. 6, 1924

1,672,207

Inventor
Harvey D. Geyer
By his Attorneys
Blackmore, Spencer & Hill

Patented June 5, 1928.

1,672,207

UNITED STATES PATENT OFFICE.

HARVEY D. GEYER, OF DAYTON, OHIO, ASSIGNOR TO GENERAL MOTORS CORPORATION, OF DETROIT, MICHIGAN, A CORPORATION OF DELAWARE.

AUTOMOBILE CURTAIN WINDOW.

Application filed February 6, 1924. Serial No. 690,942.

This invention relates to a construction for securing a window within a frame and is illustrated as embodied in an automobile.

One desirable manner of holding an automobile window in its frame is by the use of a glass retaining member adapted to be attached to a frame carried by an automobile curtain and which embraces the external periphery of a glass in such a manner as to be readily removable as a unit with the glass without disturbing the frame structure or its securing means to the curtain fabric.

One object of the invention is to provide an elastic glass retaining strip which when placed in position within the curved portion of a frame conforms tightly to said frame by a tensioning action.

Another important object is to conceal the means for attaching a glass retaining member of this general character to the frame. In one desirable and inexpensive arrangement, tacks are used as the attaching means, and the retaining member is slotted to form a tongue or flap which conceals the heads of the tacks.

Another feature of the invention relates to providing concealed means for attaching to the frame an outer rigid ring which overlaps the joint between the retaining member and frame and serves to support the glass so that in connection with the above described means for attaching the retaining member, a structure is provided in which no fastening elements are visible. In one form, the ring is provided with a flange fitting into the frame so that it can be held by fastenings concealed by the retaining member.

Other features of the invention relate to novel desirable particular constructions which will be apparent from the following description of the embodiment of the invention shown in the accompanying drawings.

Figure 1:
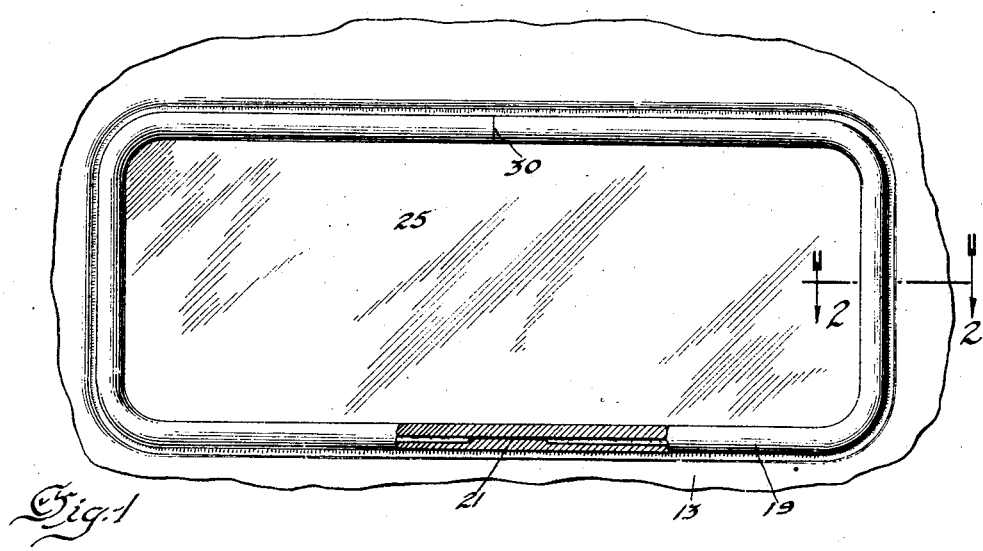
Figure 1 is a rear elevation of a back curtain light, parts broken away.
Figure 2:
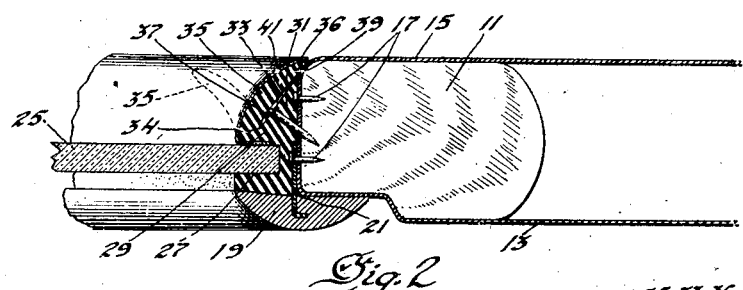
Figure 2 is a sectional view through a portion of the window taken on line 2—2 of Figure 1.
Figure 4:
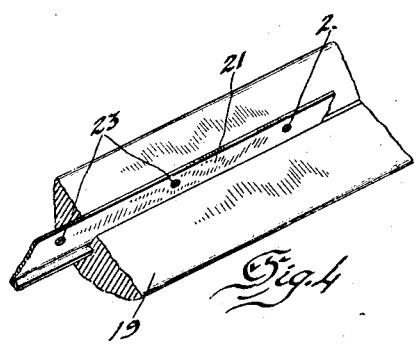
Figure 4 is a perspective view of a portion of a rigid outer ring and a flange which is attached to the frame.

In the particular arrangement selected for illustration of the invention, a frame 11 is secured to the outer curtain fabric 13 and the inside fabric lining 15 by means of tacks 17 in the inner periphery of the frame. A rigid outer ring 19 has an insert 21 which is preferably moulded into the ring 19 and is provided with a plurality of apertures 23 for the reception of tacks or screws. This insert 21 is adapted to fit in the frame 11 and is attached to the inner periphery by means of the tacks 17 which hold the outer curtain fabric 13. The fabric is trimmed along the edge of flange 21, or the insert may be attached over the edge of the fabric after the latter has been attached to the frame. When the ring is attached to the frame as above described a portion extends beyond the inner periphery of the frame bridging the joint between the frame and a glass retaining member.

A glass 25 has its outer periphery entering a channel 27 on the inside surface of a glass holding member 29 which is preferably made of a strip of elastic material such as rubber, the ends of which appear at 30. An inwardly extending portion 31 integral with the member 29, is constructed and arranged to be attached to the inner periphery of the frame 11.

It is very desirable to conceal the attaching means in an efficient and inexpensive manner, and one feature of the present invention relates to securing this effect. The illustrated form shows the extending portion 31 cut or slotted at 33 to form a tongue or flap 35 which conceals the heads of the retaining tacks 37 passing through the extended portion 31 and the inner periphery of the frame 11.

The cut or slot 33 is formed in the rubber strip 29 in such a manner that the base portion 34 and the outer edge portion 36 adjacent the region 39 of the frame, have equal linear dimensions when the strip is formed, i. e., before it is put in position in the frame, the portion 36 being appreciably nearer the frame than the base portion 34. When the strip is applied to a curvilinear surface, the base 34 has a perimeter less than the perimeter of the outer edge adjacent the region 39 of the frame. This increased perimeter causes a stretching of the outer portion of the flap 35 and its natural tendency is to tightly close the cut or slot 33.

In applying the tacks 37 the flap is drawn outwardly with the finger, as shown dotted, and the tacks driven in. The flap then snaps back of its own accord over the tacks. Where this rubber is used in connection with frames of the curvilinear type, as in automobile windows, the natural tendency of the rubber is strongly to conform with the region 39 of the frame, in fact, if drawn away it comes back with a snapping action as in the case of the release of an ordinary tough rubber band. The exposed surface of the retaining member is preferably covered with a fabric 41, one edge of which is secured between the rubber and glass and the other edge is firmly held against the frame by the pinching action of the flap 35. The fabric covering 41 may be shellacked or glued to the exposed surface. The arch shaped surface which is covered by the fabric 41 is more rigid than the surface of the flap formed by the cut 33, and the outer edge portion 36 will bend in the direction of least resistance, which is toward the frame.

It is apparent that with this arrangement the outer rigid ring and glass retaining member are secured to the frame by concealed fastenings, thus obviating the use of unsightly exposed fastenings and yet obtaining a construction which is readily removable without disturbing any of the frame or dismantling the outer rigid ring, and a tight seal against the penetration of water to the inner lining is obtained. The glass is removable as a unit with its retaining member.

Figure 3:
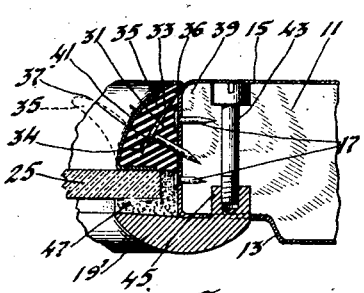
Figure 3 is a view corresponding to Figure 2 showing a modified construction.

It will be understood that the glass retaining member with its novel concealed attaching means might be used with various forms of frame structure. One modified form is shown in Figure 3 wherein the rigid outer ring 19' is attached to the frame by screws 43 extending through the frame, engaging screw threaded apertures in a plurality of embedded bosses 45. The heads of the screws are shown embedded in the frame flush with the inside surface, the inside fabric lining 15 covering the screw heads. The rubber strip in the figure is shown without the channel and does not carry the glass as a unit but retains the glass within the frame against a felt 47, or another rubber strip, which lies between the edge of the glass and frame and between the glass, and outer rigid ring 19'. Manifestly this strip may be used generally where it is desired to avoid exposure of the strip retaining means.

While one embodiment of my invention has been illustrated and described, it is not my intention to limit its scope to that particular embodiment or otherwise than by the terms of the appended claims.

I claim:

1. In combination, a frame having an opening, a transparent member received in said opening, an elastic strip retaining said member in said opening, means for retaining said strip in place on the frame, said strip including an element concealing said last named means and having its outer edge portion in tension whereby it tends to draw firmly to the remainder of said strip.

2. In combination, a frame having an opening, a portion of the periphery of which is curved, a transparent member received in said opening, an elastic strip fastened to said frame along the edge of said member and extending along said curved portion, said strip having a base portion and an outer edge portion, the latter being appreciably nearer the frame than said base portion, said edge portion and said base portion being normally of the same length whereby when the strip is placed in position on the frame said edge portion is tensioned and thereby caused to conform to the frame along the curved portion thereof.

3. In combination, a frame having an opening, a glass holding member of elastic material having a channel, a glass having its edges entering said channel, said retaining member constructed and arranged to engage the inner periphery of said frame and extending across the edge of the glass between the edge and frame to form a seal against penetration of water, means for retaining said strip in place on the frame, said strip including an element concealing said last named means and having its outer edge portion in tension whereby it tends to draw firmly to the remainder of said strip.

4. In an automobile curtain window, the combination with a frame having an opening therein, of a glass, a glass holding member of elastic material having a channel on its inside surface to embrace the external periphery of said glass and also having an integral portion adapted to be fastened to said frame, fastenings for said portion, and an integral flap concealing said fastenings and said integral portion to which the fastenings are attached.

5. An article of manufacture comprising a strip of elastic material having a channel and a portion adapted to receive means for attaching said strip, said strip including an element adapted to conceal said last named means and adapted to have its outer edge portion in tension whereby it tends to draw firmly to the remainder of said strip when attached to a curvilinear surface.

6. An article of manufacture comprising a strip of elastic material having a frame-engaging attaching face and a fastening-concealing flap formed by a cut diverging from said face into the strip from a position adjacent one edge of said face, in such a manner as to provide a fastening receiving portion and a fastening-concealing flap which, when the strip is applied to a curvilinear surface has a free edge substantially longer than its base to be held stretched against the fastening-receiving portion to conceal the fastenings.

7. In an automobile curtain window, the combination with a frame having an opening therein, of a glass, a glass holding member of elastic material having a channel on its inside surface to embrace the external periphery of said glass, said retaining member constructed and arranged to engage the inner periphery of said frame and extending across the edge of the glass between said edge and frame, an integral portion on said glass holding member to be fastened to said frame, fastenings carried by said portion, and an integral flap on said glass holding member concealing said fastening and having its outer edge portion in tension whereby it tends to draw firmly to the remainder of said strip, a rigid outer ring having a flange attached to the inner periphery of said frame, said retaining member covering said flange and attaching means.

8. In an automobile curtain window, the combination with a frame having an opening therein, of a glass retaining member having a channel, a glass having its edges entering said channel, said retaining member constructed and arranged to engage the inner periphery of said frame, concealed means for holding said glass retaining member within the opening of said frame, and a rigid outer ring secured to said frame by concealed fastenings, said ring overlapping portions of said retaining member and frame.

9. In an automobile curtain window, the combination with a frame having an opening therein, of an outside fabric and an inside fabric lining, a glass retaining member having a channel, a glass having its edges entering said channel, and a rigid outer ring overlapping the joint between said frame and the glass retaining member, all of which are attached to the inner periphery of said frame by concealed fastenings.

In testimony whereof I affix my signature.

HARVEY D. GEYER.